United States Patent [19]
Espie et al.

[11] Patent Number: 6,076,183
[45] Date of Patent: Jun. 13, 2000

[54] METHOD OF MEMORY ERROR CORRECTION BY SCRUBBING

[75] Inventors: Eric Espie, Villard de Lans; Zoltan Menyhart, Meylan, both of France

[73] Assignee: Bull, S.A., Louveciennes, France

[21] Appl. No.: 08/993,109

[22] Filed: Dec. 18, 1997

[51] Int. Cl.[7] .............................. G06F 11/10; G11C 29/00
[52] U.S. Cl. ............................. 714/764; 714/6; 714/773
[58] Field of Search ..................................... 714/764, 754, 714/773, 6

[56] References Cited

U.S. PATENT DOCUMENTS

| | | | |
|---|---|---|---|
| 5,263,032 | 11/1993 | Porter et al. | 371/40.2 |
| 5,267,242 | 11/1993 | Lavallee et al. | 371/10.1 |
| 5,428,761 | 6/1995 | Herlihy et al. | 395/425 |
| 5,502,728 | 3/1996 | Smith, III | 395/182.03 |
| 5,588,112 | 12/1996 | Dearth et al. | 395/182.07 |
| 5,629,950 | 5/1997 | Godiwala et al. | 371/51.1 |
| 5,768,560 | 6/1998 | Lieberman et al. | 395/494 |

*Primary Examiner*—Stephen M. Baker
*Attorney, Agent, or Firm*—Edward J. Kondracki; Miles & Stockbridge P.C.

[57] ABSTRACT

The invention relates to a method of correction of corrupted data stored in a memory location by scrubbing. The memory is associated with an error correcting code device which corrects the data transmitted to a user requesting them. The method comprises three steps. During a first step, the data is read from the memory at an address contained in a first register, corrected, and stored into a second register. A reservation is created. During a second step, if a reservation exists the data contained in the second register is written back into the same memory location. The reservation is cleared and a particular field of a condition register is modified. If a reservation does not exist, the second step is completed without altering the memory location. During the third step, the status of the condition register is checked. If the test is positive the process is ended, the scrubbing being successful; if not, an iteration of the three above steps is executed.

23 Claims, 4 Drawing Sheets

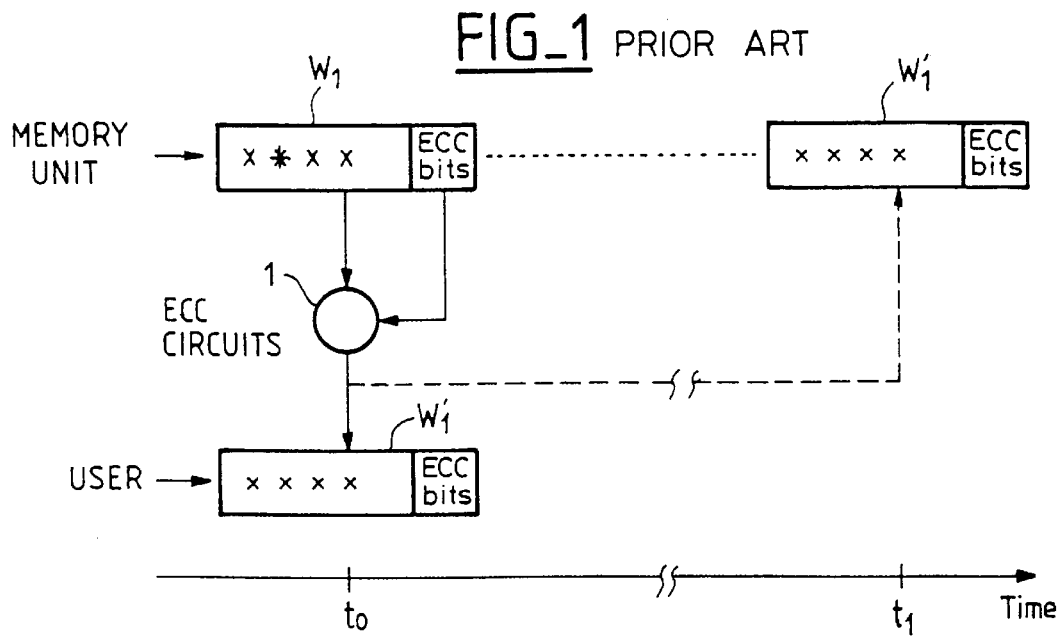
FIG_1 PRIOR ART
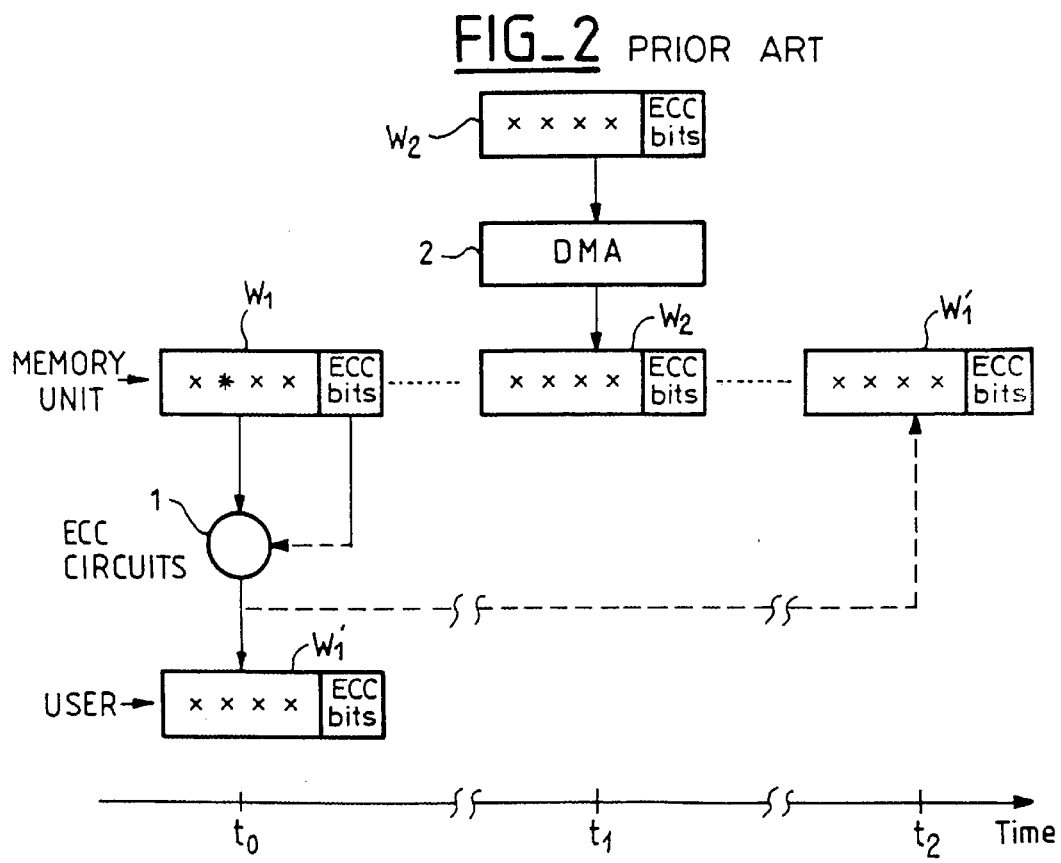
FIG_2 PRIOR ART

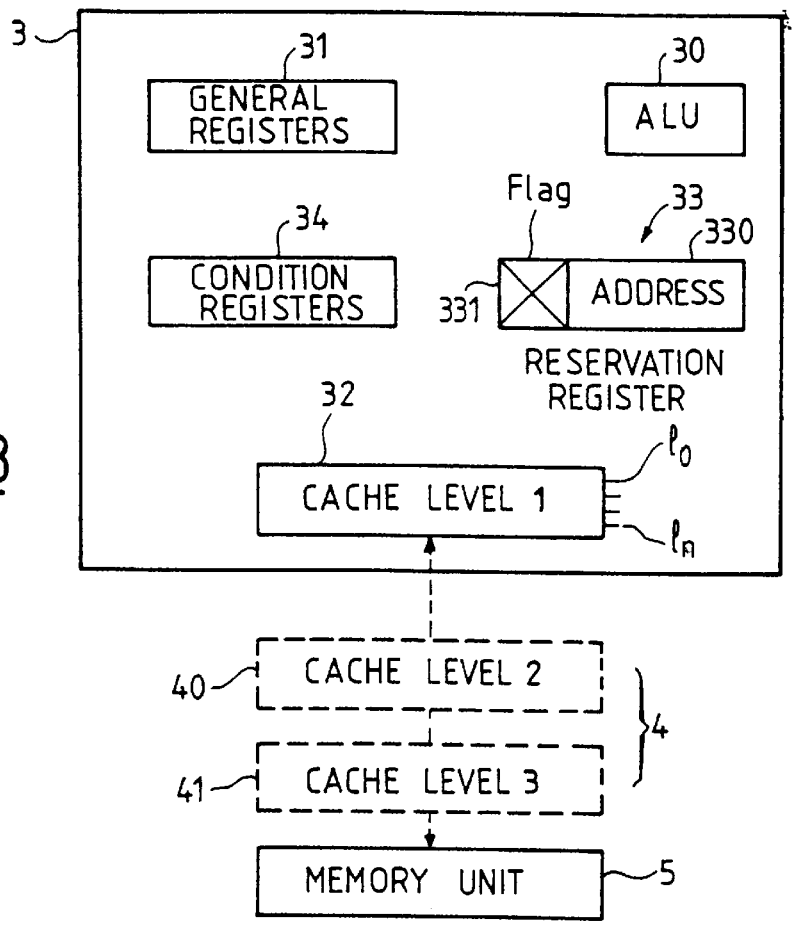
FIG_3
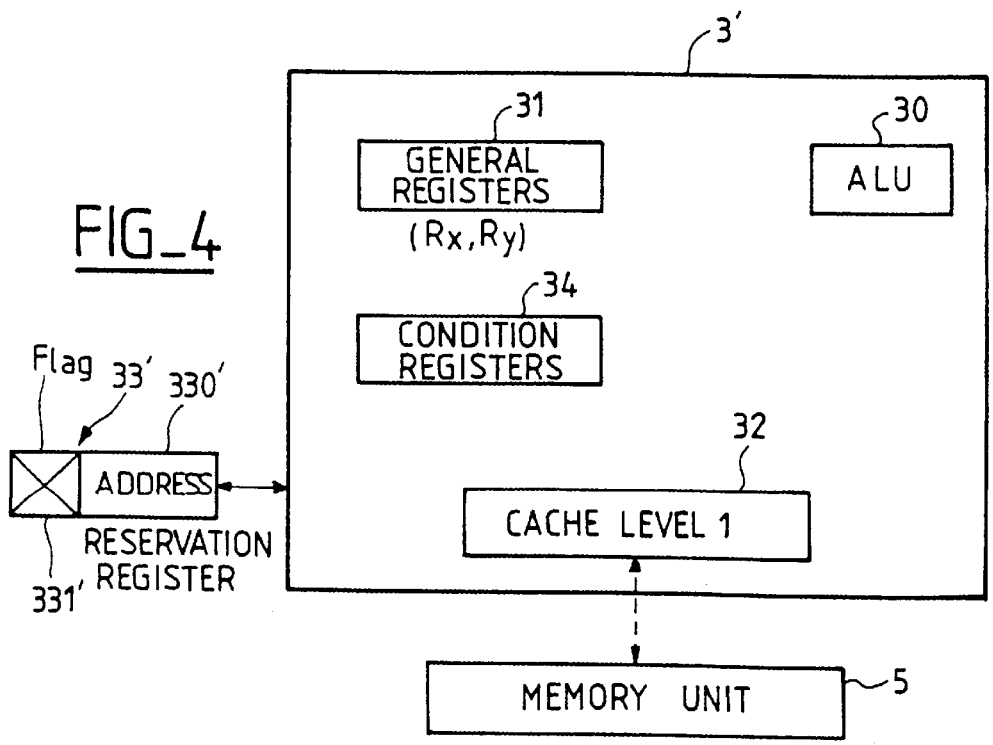
FIG_4

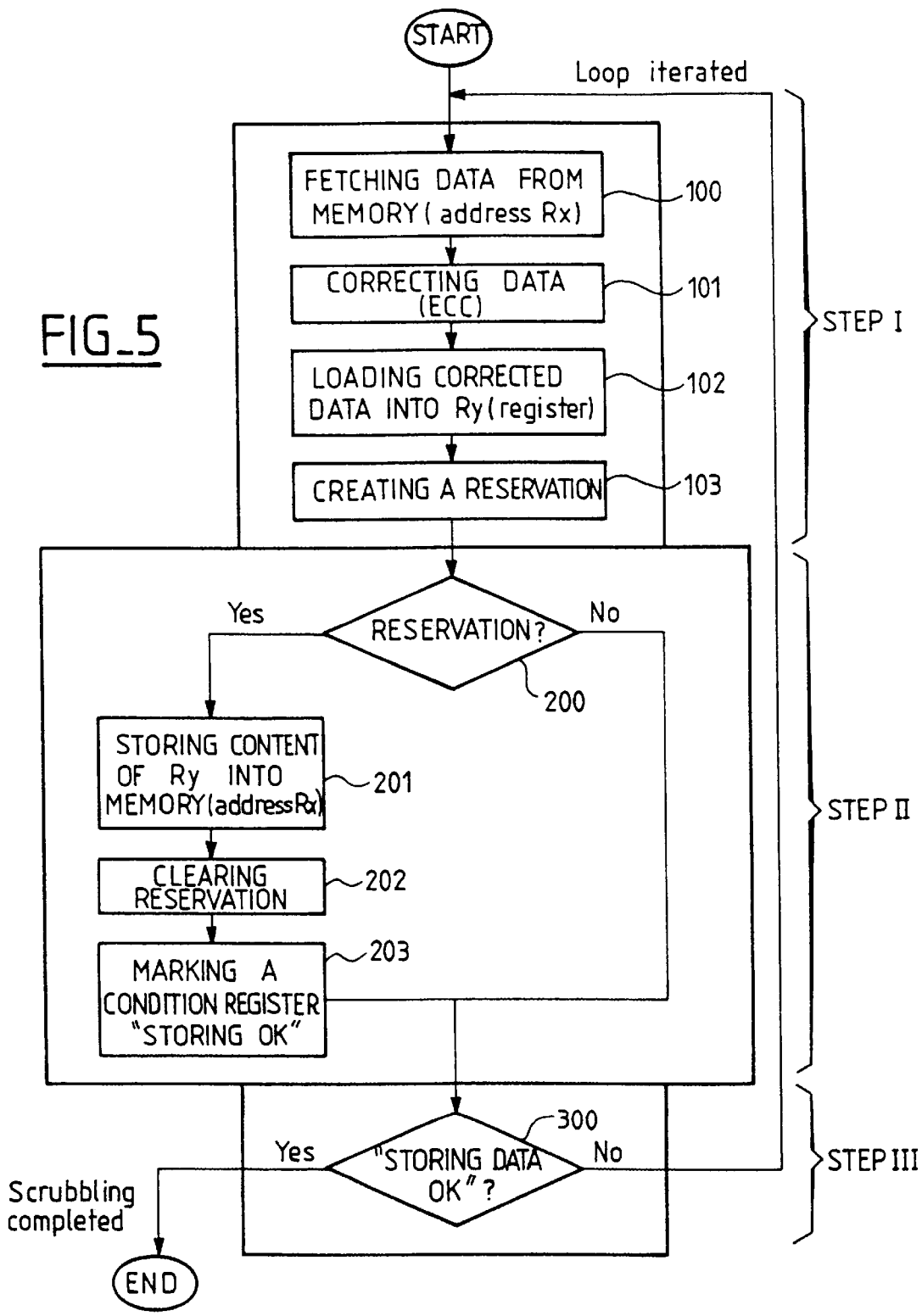

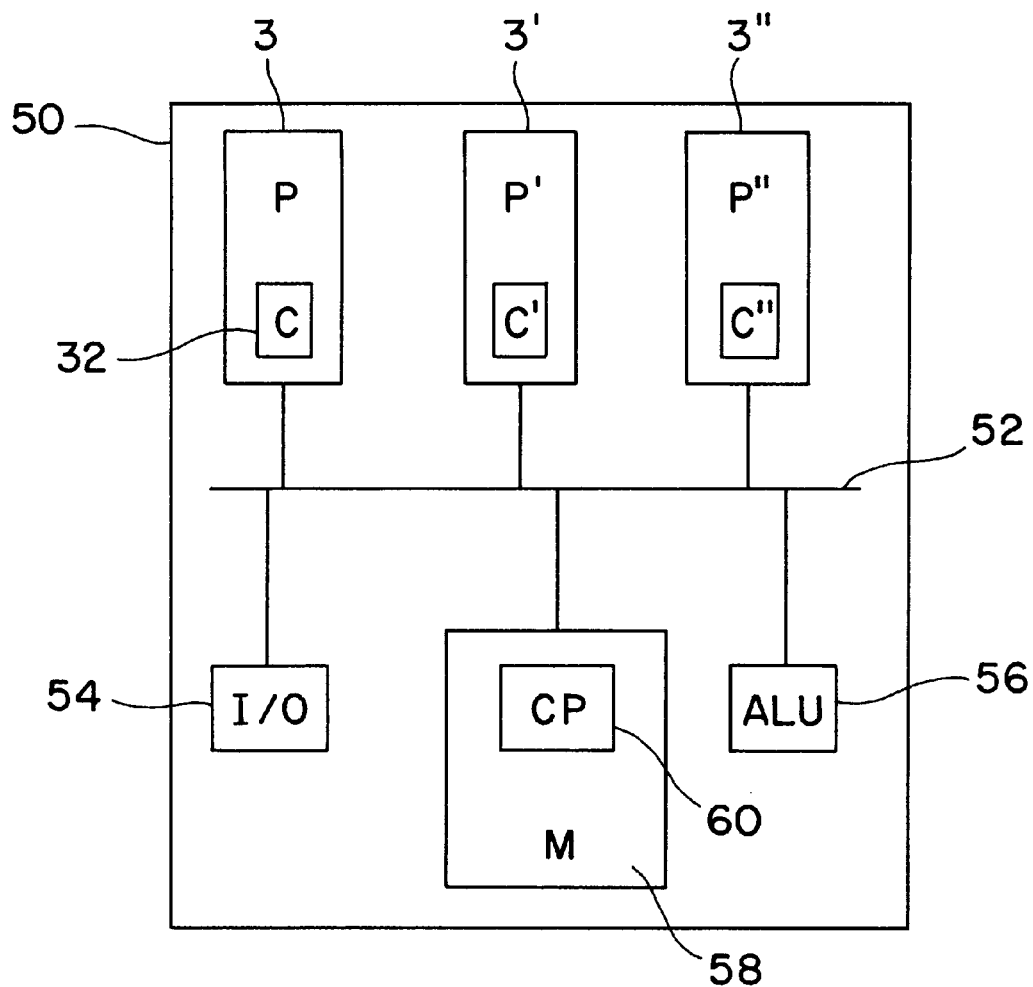
FIG_6

METHOD OF MEMORY ERROR CORRECTION BY SCRUBBING

BACKGROUND OF THE INVENTION

1. Field of the Invention

The invention relates to a method of memory error correction by scrubbing.

2. Description of the Prior Art

A computer memory is usually equipped with hardware circuits which detect errors and repair them. To this end, Error Correction Code, here-after called "ECC", is used. The data in the computer memory contains information bits and redundant bits computed from the information bits. Such a code is capable of supplying correct (i.e. recovered) data to a particular processing element even if some bits of the data in the memory are corrupted. This mechanism provides a security reserve against the data loss.

The capability to correct corrupted data is primarily limited by the length of the redundant part of the data. Accordingly, once a data element contains some corrupted bits, there is not enough security reserve against additional bit corruption. Measures have to be taken to rewrite the corrupted data into the memory with a fresh and corrected copy. This later task is referred to as memory scrubbing.

BRIEF DESCRIPTION OF THE DRAWINGS

FIG. 1, appended to the description, illustrates the above-recalled process. It is assumed that a word $W_1$ is stored in a given memory address. In addition to the information bits, ECC bits are provided in order to perform a correction if needed. It is further assumed that word $W_1$ contains a corrupted bit shown as an asterisk. When $W_1$ is fetched from the memory and transmitted to another location of the computer, called "User", the ECC circuits 1, using the ECC bits, repair corrupted word $W_1$. The transmitted word, i.e. $W'_1$, is thus correct. This operation takes place at time $t_0$.

The word stored in the memory, $W_1$, remains unchanged, i.e. corrupted. As above recalled, the reserve of security is low, and the data may be further corrupted, even to an extent that it cannot be corrected (due to the limited correction capacity of the ECC bits). To avoid this adverse effect, it is necessary to refresh the memory with corrected data, i.e. word $W'_1$. At time $t_1$, this data is written back into the same memory or address. The ECC bits recover their full correcting capacity.

The basic problem is that any active components (processors, DMA-s, i.e. Direct Memory Access devices), may modify at any moment the data to be refreshed, and consequently, a race condition can develop: if an active component modifies the data before the refreshment can take place, the new data is going to be lost, because the scrubbing mechanism writes back the original data.

FIG. 2, appended to the description, illustrates the above-recalled process. As in FIG. 1, word $W_1$ is corrupted. At time $t_0$, word $W_1$ is read from a given memory location, corrected by ECC circuits 1 and transmitted to a "User".

At time $t_1$, a new word $W_2$ is written into the same memory location through a DMA circuit 2 and modifies the content of that memory location. However, at time $t_2$, the corrected word $W'_1$ is written back into that memory location (as at time t1 in FIG. 1). Word $W_2$ is thus lost.

To overcome this problem, the existing prior art solutions use techniques to exclude the active components from accessing the memory.

Some existing machines achieve data refreshment by means of additional hardware devices making memory reading and correction cycles indivisible.

Other approaches consist in freezing or stopping the other active components in the machine by software means while the data in the corrupted memory is being refreshed.

The above solutions are unsatisfactory.

On the one hand, using additional hardware devices does not meet the main requirements of modern computers, i.e.:
  simplification of the hardware circuits;
  drastic reduction of sale costs.

On the other hand, freezing or stopping the other active components in the machine by software means requires defining "consistency points" where it can be ensured that the active components have not got more recent data in their caches than the memory has (i.e. they have not got any possibility to write into the memory, because cache copy-back or the direct memory access is not under control of the software). This approach can be only used for monoprocessor machines. For multiprocessor machines, too much inter-processor synchronization would be required.

Furthermore freezing or stopping mechanisms are time consuming and thus impair the performance of the machine.

Taking advantage of the ECC, a main object of the invention is to offer the possibility to refresh the corrupted data without any additional hardware support or disturbing the operations of the other active components, such as processors, DMA-s, etc.

The invention is directed to alleviating the drawbacks of the prior art devices, some of which have just been referred to, and to meeting the stated requirements.

SUMMARY OF THE INVENTION

The invention consists of a method for correcting corrupted data stored in a main memory location of a given address by scrubbing the main memory location, said main memory being associated with an error correcting code device in order to correct said corrupted data as they are read from said main memory location and transmitted to a user requesting such data, reading and writing of data from and into said main memory being under control of a processor, the method consisting in an iterative loop comprising the three following steps:

a first step comprising a stage of fetching data from said main memory location of given address, a stage of correcting said data by means of said error correcting device, a stage of loading said corrected data into a second memory location, and a stage of creating a reservation information associated to said given address;

a second step comprising a stage of checking whether a reservation information associated to said given address exists, and:
   (i) if the condition checked is true, executing the following further stages: storing the content of said second memory location into said memory location of given address, in order to perform said scrubbing, erasing said reservation information, storing a predetermined condition information into a third memory location, in order to reflect the effective data storing into said main memory location of given address, and
   (ii) if the condition checked is false, executing a stage consisting in completing said second step without altering the content of said main memory location of said given address;

and a third step comprising a stage of checking the status of said condition information, and:
   (i) if said status indicates that said storing corrected data has failed, executing an iteration of the above three steps, (ii) if said status indicates that said storing of corrected data has been executed, ending said loop, scrubbing of said main memory location of given address being successful.

According to a preferred embodiment of the invention, the process is implemented in a "PowerPC™" based machine. A processor of the latter type (for example a processor such as "PowerPC™604") provides a data protection called "reservation", which will be later explained in detail.

Contrary to the existing solutions which exclude all other memory accesses while the memory scrubbing is taking place, the approach according to the invention can start the memory scrubbing at any moment, without any need of synchronization or mutual exclusion. It makes use of an instructions sequence that fails and restarts if somebody is modifying the same data area. If this scrubbing instruction sequence reaches its end, then it is sure that no other active component has modified the same memory location in the meantime and therefore the race condition was avoided.

Any operating system can take advantage of this mechanism.

LIST OF THE DRAWINGS

The invention will be more clearly understood and other features and advantages will emerge from reading the following description, given with reference to the appended drawings wherein:

FIGS. 1 and 2 illustrate methods according to the prior art and drawbacks thereof;

FIG. 3 illustrates a machine implementing the method of the invention according to a preferred embodiment;

FIG. 4 illustrates a machine implementing the method of the invention according to a more general embodiment;

FIG. 5 is a flowchart of the error correcting method by scrubbing according to the invention.

FIG. 6 is a multiprocessor according to the invention.

DETAILED DESCRIPTION OF THE INVENTION

Though the invention is not limited to "PowerPC™" based machines, the following detailed description applies to such a configuration (which constitutes the preferred embodiment), unless otherwise stated.

Such processors are described in "PowerPC™601—RISC Microprocessor User's Manual" and "PowerPC™604—RISC Microprocessor User's Manual", both published by MOTOROLA Inc., in 1993 and 1994 rsp.

FIG. 3 is a block diagram showing the main parts of a processor 3 according to the preferred embodiment. In typical manner, processor 3 comprises an ALU (Arithmetic Logic Unit) 30, general registers 31, condition registers 34, and a built-in first level cache memory 32, plus other well-known circuits (clock circuits, etc.) not shown. Cache memory 32 is split into lines $I_0$ to $I_n$ of a given byte-length.

More specifically, it contains a register 33, so-called "reservation register". The register 33 is split into two fields: a first field 330 dedicated to the storing of a word specifying a memory location to be scrubbed, and a second field 331 dedicated to the storing of a flag. The mechanism of the reservation will be explained hereafter.

Processor 3 communicates with a memory unit 5, directly or through one or more optional caches 4, called second level cache 40, and in some cases a third level cache 41, as shown in FIG. 3. For the sake of simplicity, it will be assumed that processor 3 is directly attached to memory unit 5, via a bus (dotted line).

When data are read from main memory unit 5, a copy is written into cache memory 32.

The process of refreshing the memory by scrubbing according to the invention will be now explained.

The standard instructions set of the "PowerPC™" processors comprises, among others, the two following ones called "LWARX" and "STWCX." instructions, which are more particularly associated to a so-called reservation mechanism. Here-after, "instruction LWARX" and "instruction STWCX." will be replaced by "LWARX" and "STWCX.".

The complete name of the first instruction, i.e. "LWARX", is "Load Word and Reserve Indexed". This instruction is associated with three registers called rD, rA and rB. A detailed description of this instruction is given in the above-mentioned "User's Manual".

This instruction creates a reservation for use by a store word conditional instruction. This operation consists in storing an address associated with the reservation into the first field 330 of the register 33, and in setting the flag stored in the second field 331 to a value reflecting that a reservation is created (for example setting a bit to "1"). A target address called EA, is computed from two other address words contained in two general registers called rA and rB. More precisely EA is the sum (rA|( ))+(rB). The word in memory addressed by EA is loaded into a further register called rD. An address computed from EA is associated with the reservation (field 330 of register 33) and replaces any address previously associated with the reservation.

The complete name of the second instruction, i.e. "STWCX.", is "Store Word Conditional Indexed". This instruction is associated with three registers called rS, rA and rB. A detailed description of this instruction is also given in the above-mentioned "User's Manual".

As above, the target address EA is the sum (rA|( ))+(rB). If a reservation exists (flag stored in field 331 of register 33), the contents of the register rS are stored into the word in memory location addressed by EA and the reservation is cleared (bits of field 331 set to zero). If no reservation exists, the instruction completes without altering said memory location.

A condition register field, called "CR( ) Field", is used. It is set to reflect whether the store operation was performed, i.e. whether a reservation existed when the "STWCX." began execution. A bit in the condition field CR( ), called "EQ" (namely bit No. 2), is set to "1" if the data store was completed successfully.

The invention takes advantage of this mechanism (or more generally of a similar mechanism as it will be described with respect to FIG. 5), as well as the existence of ECC, to implement a refresh process using scrubbing which allows memory accesses while the memory scrubbing is taking place, the memory scrubbing starting at any moment, without any need of synchronization or mutual exclusion.

The invention makes use of an instructions sequence that fails and restarts if somebody is modifying the same data area. If the scrubbing instruction sequence reaches its end, then it is sure that no other active component has modified the same memory location in the meantime, therefore the race condition was avoided.

The particular scrubbing sequence is the following iterative sequence of instructions:

| | |
|---|---|
| LWARX | Ry, 0, Rx |
| STWCX. | Ry, 0, Rx |
| BNE | loop |

"LWARX" and "STWCX." are the above recalled standard instructions. Ry, 0, and Rx refer to the registers rD, rA and rB, respectively, for instruction "LWARX", and to registers rS, rA and rB, respectively, for instruction "STWCX.".

According to the example described, rA is always zero. More specifically, it is assumed that Rx is one of the general register 31 and contains the address to be scrubbed, and Ry is a scratch register.

The loop instruction called "BNE" is a "branch conditional" instruction. In the present case, this instruction checks a particular bit of the condition register field CR( ), namely bit No. 2.

To summarise, during the first step (instruction "LWARX") data load takes place and a reservation in register 33 is made. Due to the ECC, the data loaded are correct. During the second step (instruction "STWCX."), if a reservation exists (flag stored in field 331 of register 33), the content of Ry is stored into the word addressed by Rx. If the store is completed, bit "EQ" of the Condition register "CR( )" is set to "1". Obviously, said bit "EQ" must be reset to zero at the beginning of instruction "STWCX". During the third step, the instruction "BNE" checks this bit. If the store operation was not completed during the previous step (i.e. scrubbing is not achieved), the loop is iterated once again.

It is enough that a processor has the corrected data in its cache in modified state. Since then, there can be no more access to the defective data in the memory. A corrected data is provided to anyone who wants to access it. Eventually the corrected data will replace the corrupted one in the memory.

Now, the main situations when a scrubbing sequence collides with another memory cycle, i.e. when there is contention for accessing the memory location to be scrubbed, will be detailed below. Obviously, if there is no other access to said memory location, the scrubbing operation can be executed without any problem.

EXAMPLE 1

"fetch" instruction by another processor (e.g. a processor in another machine or module) competes with scrubbing.

"Fetch" instruction and "LWARX" can be executed in any order. The caches tolerate if the same line is accessed as data and instruction. Due to the ECC, the instruction fetched is correct. There will be no write-back due to this "Fetch" instruction. "LWARX" gets the correct data and obtains the reservation. "STWCX." obtains the exclusivity (the instruction cache is not affected) and completes successfully; the error is thus repaired. There is no iteration (loop).

EXAMPLE 2

"Data load" instruction by another processor competes with scrubbing.

"Data load" instruction and "LWARX" can be executed in any order. Due to the ECC, the data loaded is correct. There will be no write-back. "LWARX" gets the correct data and obtains the reservation. The states of both caches are shared. "STWCX." obtains exclusivity and completes successfully, the error is repaired. The data cache line of the other processor gets killed. There is no iteration (loop). The cache line of the other processor containing the data may have to be re-fetched if the load instruction has not been completed before "STWCX." obtains exclusivity.

EXAMPLE 3

"Data load-modify-store" instruction by another processor competes with scrubbing.

The cache line containing the data gets loaded. This operation and "LWARX" can be executed in any order. The loaded data is correct. "LWARX" gets the correct data and obtains the reservation. The states of both caches are shared. "STWCX." and the store competes for obtaining exclusivity. The data cache line of the looser processor gets killed, if "STWCX." has lost, the reservation gets lost, too.

There are two cases:

If "STWCX." wins, then it completes successfully, the error is repaired. There is no iteration (loop). The cache line of the other processor containing the data has to be re-fetched for the sake of the pending store. Finally, the store will be accomplished.

If the store of the other processor wins, then the error gets repaired. The scrubbing loop will do another iteration. "LWARX" forces the copy-back operation to take place. Next "STWCX." succeeds.

EXAMPLE 4

"Data store" instruction by another processor competes with scrubbing.

If the data line is in the cache of the processor intending to execute the store, then this situation is covered by the previous case 3. Otherwise, "LWARX" gets the correct data and obtains the reservation. The processor intending to execute the store issues a read with intention to modify type bus cycle that kills the data obtained by "LWARX" (the reservation gets lost too) and fetches the cache line (the data is correct). It inserts the data of the store into the cache line. The data in memory location to be scrubbed will be correct when the copy-back takes place. "STWCX." fails. The scrubbing loop will do another iteration and next "LWARX" forces the copy-back operation to take place. Next "STWCX." succeeds.

EXAMPLE 5

A "LWARX/STWCX." instructions sequence by another processor competes with scrubbing.

Both of the two "LWARX" instructions get the correct data. One of the two "STWCX." instructions succeeds (the data is corrected), the other loop has to repeat its iteration. "LWARX" forces the copy-back operation to take place. The correctness of competing "LWARXISTWCX." instructions sequences is the very essence of the multiprocessor architecture synchronization.

EXAMPLE 6

A "DCBZ" instruction by another processor competes with scrubbing.

The complete name of "DCBZ" is "Data Cache Block to Zero". It is an instruction specially dedicated to certain cache memory operation. It allows to clear to zero all bytes of a block.

If "DCBZ" executes after "LWARX" but before the "STWCX." instruction, then it kills the data obtained by "LWARX" (the reservation is lost too). The processor having executed "DCBZ" owns the cache line corresponding to the defective memory location in modified state. The scrubbing loop will do another iteration and next "LWARX" forces the copy-back operation to take place and subsequent "STWCX." succeeds.

EXAMPLE 7

"DMA accesses" compete with scrubbing.

Any "DMA" sequence falls into already described examples 2, 4 or 6.

The above recalled examples may be summarized as follows:

a/ If the scrubbing loop has completed successfully, then the error has been repaired, because:

it is sure that nobody else wanted to modify the data;

the content of the memory location to be scrubbed has not been altered (with respect to the data supplied by the ECC logic).

b/ If someone else is modifying the content of the memory location to be scrubbed, then the scrubbing loop fails. As explained in the examples, if an other process "wins", i.e. it writes new data into said memory location before the scrubbing process completes (see for example FIG. 2). The reservation is lost (bits of flag stored in field 331 of register 33 cleared). The scrubbing process according to the invention does not modify the data in any way and retries the operation later.

For most of the memory operations, it is very important to achieve what is called a "coherency", specially with respect to the "DMA" operations, and more especially in a multiprocessor architecture, as shown in exemplary form in FIG. 6. FIG. 6 shows multiprocessor 50 including a plurality of processors (P) indicated by reference numerals 3, 3', 3", each having an architecture such as, for example, processor 3, illustrated in FIG. 3. Each of processors 3, 3', 3" has respective cache C, C', C", which are comparable to cache 32 shown in FIG. 3. Multiprocessor 50 includes appropriate bus 52 connecting processors 3, 3', 3" with other multiprocessor 50 components, including I/O 54, ALU 56, and memory (M) 58, all cooperating in known manner. Memory (58) further includes a means for running a coherency protocol function (CP) 60.

An example of coherency protocol is given by the so-called "MESI" protocol, which is described in the previously cited "User's Manuals". Bus snooping is used to drive a four-state cache coherency protocol which ensures the coherency of all processor and direct-memory access (DMA) transactions.

The coherency of memory is maintained at a certain granularity, typically at a granularity of 32-byte cache blocks.

The four possible states for a block in a cache are the following ones:

1. Modified: The addressed block is valid in the cache and in only this cache. The block is modified with respect to the system memory. The modified data in the block has not been written back to the memory.
2. Exclusive: The addressed block is in this cache only. The data in this block is consistent with system memory.
3. Shared: The addressed block is valid in the cache and in at least one other cache. This block is always consistent with system memory. The shared state is shared-unmodified. There is no shared-modified state.
4. Invalid: This state indicates that the addressed block is not resident in the cache and/or any data contained is not considered useful.

Coherency is a very important feature of multiprocessor systems. For example, a given processor must obtain an exclusive access to an addressed block before an update is made.

As already indicated, according to the preferred embodiment, the machines are based on a "PowerPc™" microprocessor. Though it is very efficient to use such a processor because the so-called "reservation mechanism" and the instructions as well as the hardware (reservation register) needed to implement said mechanism are provided as standard, it should be clear however that the invention is not limited to this sole architecture.

Generally speaking, in order to implement the iterative scrubbing loop according to the invention, the following requirements have to be met.

With respect to the hardware, the microprocessor (see FIG. 3: 3) must comprise general registers and condition registers. These registers are needed to store the address to be scrubbed (register Rx), the content of this address (register Ry), after the correcting process (ECC) is performed, and a condition register (FIG. 3: 34). Such registers do exist in any integrated microprocessors.

According to an essential feature of the invention, a further register is needed, i.e. the so-called "reservation register". If the microprocessor does contain any built-in register which can be employed to this end, an external memory location constitutes an alternative solution, e.g. an external dedicated register.

FIG. 4 is a block diagram showing the architecture of this further embodiment. As in the preferred embodiment (FIG. 3), processor 3' comprises an ALU 30, general registers 31, conditions registers 34 and a cache memory 32. Processor 3' communicates with a main memory unit 5 through a bus (dotted line). However, contrary to the processor 3 (FIG. 3), a built-in "reservation register" is not provided. An external register 33' acts as a "reservation register". It is also split into two fields: a first field 330' intended to store an address associated to the reservation, and a second field 331' intended to store a flag. This flag can be one sole bit and is set to a predetermined value reflecting whether a reservation exists or not.

FIG. 5 is a flowchart implementing a scrubbing iterative loop according to the invention. This flowchart shows a three-step iterative process of memory scrubbing which meets the specific features of the invention, i.e. without any need for synchronization or mutual exclusion.

STEP I comprises four stages: 100 to 103.

Stage 100 consists in data fetching from memory 5 at the address contained in register Rx (or computed from the content of this register). Said address is relating to the memory location to be scrubbed.

Stage 101 consists in data correction by means of ECC circuits (not shown).

Stage 102 consists in loading of so corrected data into register Ry.

Stage 103 consists in creating a reservation. This operation consists in storing an address associated with the reservation into the first field 330' of the register 33', and in setting the flag stored in the second field 331' to a value reflecting that a reservation is created (for example setting a bit to "1"). The reservation address stored in the first field 330' is computed from the content of register Rx. The manner in which the address to be associated with the reservation is computed depends on the specific architecture of the machine. It is the result of an effective address calculation well known in the art. This address replaces any address previously associated with the reservation.

STEP II also comprises four stages: 200 to 203.

Stage 200 consists in a checking operation. The content of register 33' is checked, in particular the status of the flag in the second field 331'. If a reservation exists for the address to be scrubbed (branch "Yes"), stages 201 to 203 are executed. On the contrary (branch "No"), the process is directed to STEP III. In other words, no storing operation is performed and the process completes without altering the memory location to be scrubbed.

It means that "someone else" (i.e. another process) has modifyied the content of the location to be scrubbed, then the scrubbing loop fails. As explained in the examples, if another process "wins", i.e. it writes new data into the memory address to be scrubbed before the scrubbing process completes (see for example FIG. 2). The reservation is lost (bits of flag stored in field 331' of register 33' cleared).

Stage 201 consists in storing the content of register Ry into the memory location addressed by Rx (or an address computed from this address word), i.e. the memory location to be scrubbed.

Stage 202 consists in clearing the reservation. In particular, the flag in field 331' is altered to reflect that there is no more reservation (for example, the above-mentioned bit is set to "0").

Stage 203 consists in modifying a specified field of a given condition registers 34, for example in setting a predetermined bit to the value "1". This operation reflects a status which may be called "storing OK".

Obviously, said bit must be reset to "0" at the beginning of STEP II.

STEP III comprises only one stage: 300.

After that STEP 11 is completed, whatever the path followed (branch "Yes" or branch "No"), a new check is performed. Stage 300 consists in checking the status of the condition register storing said specified field to determine whether the storing was completed during STEP II (stage 201) or not.

If the condition "storing data OK" is true (branch "Yes"), the process is ended and the scrubbing loop has completed successfully. Then the error has been safely repaired. It is sure that no other process (DMA and so on) wanted to modify the data stored in the scrubbing memory location.

If the condition "storing data OK" is false (branch "No"), the scrubbing sequence has failed and STEP I to STEP III are iterated (loop) again. The data in memory location to be scrubbed are not modified in any way.

With respect to the branch "No" of step II, it is important to note that, as stage 203 is not executed, the check performed at stage 300 always fails.

It is also important to note that each of the above detailed STEP I to STEP III must be considered as a unitary operations set. In other words, all the operations (called stages in the flowchart) are under control of processor 3'. The latter must ascertain that a particular step (STEP I to III) is completed before executing the following one. It must also ascertain the correctness of the various operations and maintain the coherency between the various cache memories, i.e. a predetermined coherency protocol is adhered to.

A reading of the above description confirms that the invention achieves the stated objectives.

It should be clear, however, that invention is not limited to the embodiments previously described, in particular with reference to FIGS. 3 to 5. As a matter of fact, as already stated, the invention is not limited to a machine based on specific integrated microprocessors. On condition that a memory location dedicated to the reservation data is provided (for example an external register), any existing integrated microprocessor or even discrete processor can be used. If instructions "LWARX" and "STWCX." or similar are not provided in the standard instructions set of the microprocessor in question (i.e. instructions performing STEP I or STEP II, rsp., at one go), it is always possible to divide each step into a sequence of substeps (or stages as shown in FIG. 5). For example, stage 200 consists in a "conditional branch" instruction which is very common. "BNE" which forces the iteration (loop) is also a "conditional branch" instruction.

While the preferred forms and embodiments of the invention have been illustrated and described, it will be apparent to those of ordinary skill in the art that various changes and modifications may be without deviating from the inventive concept and spirit of the invention as set forth above, and it is intended by the appended claims to define all such concepts which come within the full scope and true spirit of the invention.

What is claimed is:

1. A method for correcting corrupted data stored in a main memory location of a given address by scrubbing of the main memory location, said main memory being associated with an error correcting code device in order to correct said corrupted data as the data is read from said main memory location and transmitted to a user requesting such data, wherein reading and writing data from and into said main memory is under control of a processor, the method comprising the three following steps in an iterative loop:

(a) first step comprising fetching data from said main memory location of given address, correcting said data by means of said error correcting device, loading said corrected data into a second memory location, and creating a reservation information associated to said given address;

(b) a second step comprising checking whether the reservation information associated with said given address exists, and:

(i) if the condition checked is true, executing the following further steps:
          storing the corrected data in said second memory location into said memory location of given address in order to perform said scrubbing of the main memory location, erasing said reservation information, storing a predetermined condition information into a third memory location in order to reflect the effective content of said second memory location storing into said main memory location of given address, and (ii) if the condition checked is false, executing a step consisting of completing said second step without altering the content of said main memory location of said given address;

(c) and a third step comprising checking the status of said condition information, and:

(i) if said status indicates that said storing corrected data has failed, executing an iteration of the above three steps, and (ii) if said status indicates that said storing of corrected data has been executed, ending said loop, whereby said indication means that scrubbing of said main memory location of given address is successful.

2. A method according to claim 1, wherein said processor is an integrated microprocessor comprising a plurality of general registers, and said given address to be scrubbed is stored in a first general register.

3. A method according to claim 2,wherein said second memory location is a second general registrer which stores the said corrected data.

4. A method according to claim 1, wherein said processor is an integrated microprocessor and further comprising at least one condition register, said condition information being stored in a predetermined field of said condition register.

5. A method according to claim 4, wherein said condition information consists in one sole bit which is set to the logic value "1" when said data storing is executed.

6. A method according to claim 1, wherein said processor is associated with a dedicated register divided into a first and a second field, and wherein said stage of creating reservation information consists in storing into said first field an address word specifying said given address to be scrubbed, and storing into said second field a flag reflecting whether a reservation exists or not for said given address.

7. A method according to claim 6, wherein said processor is an integrated microprocessor and said dedicated register is a built-in register.

8. A method according to claim 6, wherein said processor is an integrated microprocessor and said dedicated register is an external register.

9. A method according to claim 6, wherein said flag consists in one sole bit which is set to the logic value "1" when said reservation exists.

10. A method according to claim 1, wherein said processor is an integrated microprocessor comprising a built-in cache memory and said corrected data read from said memory being copied in predetermined locations of said cache memory.

11. A method according to claim 10, wherein said predetermined locations contain blocks of a predetermined byte-length.

12. A method according to claim 10, wherein the completeness and the correctness of each of said three steps are under control of said processor.

13. A method according to claim 10 wherein said processor is a part of a multiprocessor machine comprising a plurality of cache memories where data are copied, the method further comprises a predetermined coherency protocol under control of said processor ensuring the coherency between said plurality of cache memories.

14. A method according to claim 11 wherein said processor is a part of a multiprocessor machine comprising a plurality of cache memories where data are copied, the method further comprises a predetermined coherency protocol under control of said processor ensuring the coherency between said plurality of cache memories.

15. Apparatus for correcting corrupted data stored in a location in a first main memory, by a memory scrubbing technique, said main memory being under control of a processor, comprising:

means for fetching data from said main memory location;

an error correcting device for correcting said data;

means for loading corrected data into a second memory location;

means for generating and storing reservation information associated with an address of said main memory location;

means for determining the presence of said reservation information associated with said address of said main memory location;

means responsive to said determining means for storing said corrected data in said main memory location, when said reservation information is present;

means for erasing said reservation information when said corrected data is stored;

means for storing a predetermined condition information in a third memory location, said predetermined condition information being indicative of whether said corrected data has been stored in said main memory location;

means responsive to said determining means for preventing, when said reservation information is not present, said corrected data from being stored in said main memory location;

means for checking a status of said predetermined condition information;

means responsive to said status checking means, when said predetermined condition information indicates that said corrected data has not been stored in said main memory location, for initiating further attempts by said corrected data storing means to store corrected data in said main memory location; and means responsive to said status checking means, when said predetermined condition information indicates that said corrected data has been stored in said main memory location, for ceasing operation of said apparatus with respect to said data fetched from said main memory and with respect to said corrected data.

16. Apparatus as recited claim 15, wherein said processor is an integrated microprocessor comprising a plurality of general registers, and wherein an address for said main memory location from which data is fetched is stored in a first general register.

17. Apparatus as recited in claim 16, wherein said second memory location comprises a second general register.

18. Apparatus according to claim 15, wherein said processor is an integrated microprocessor and wherein said third memory location comprises at least one condition register, and wherein said condition information is stored in a predetermined field of said condition register.

19. Apparatus as recited in claim 15, wherein said processor is associated with a dedicated register divided into a first field and a second field, and wherein said means for generating reservation information stores, in said first field, an address word specifying said address of said main memory location, and stores, in said second field, a flag indicating the presence of reservation information associated with said address.

20. Apparatus as recited in claim 19, wherein said processor comprises an integrated microprocessor, and wherein said dedicated register is a built-in register.

21. Apparatus as recited in claim 19, wherein said processor comprises an integrated microprocessor and wherein said dedicated register is an external register.

22. Apparatus as recited in claim 15, wherein said processor comprises an integrated microprocessor having a built-in cache memory.

23. Apparatus for correcting corrupted data stored in a location in a first main memory, by a memory scrubbing technique, said main memory being under control of a processor, comprising:

a multiprocessor machine having a plurality of cache memories where data are copied;

means for fetching data from said main memory location;

an error correcting device for correcting said data;

means for loading corrected data into a second memory location;

means for generating and storing reservation information associated with an address of said main memory location;

means for determining the presence of said reservation information associated with said address of said main memory location;

means responsive to said determining means for storing said corrected data in said main memory location, when said reservation information is present;

means for erasing said reservation information when said corrected data is stored;

means for storing a predetermined condition information in a third memory location, said predetermined condition information being indicative of whether said corrected data has been stored in said main memory location;

means responsive to said determining means for preventing, when said reservation information is not present, corrected data from being stored in said main memory location;

means for checking a status of said predetermined condition information;

means responsive to said status checking means, when said predetermined condition information indicates that said corrected data has not been stored in said main memory location, for initiating further attempts by said corrected data storing means to store said corrected data in said main memory location;

means responsive to said status checking means, when said predetermined condition information indicates that said corrected data has been stored in said main memory location, for ceasing operation of said apparatus with respect to said data fetched from said main memory and with respect to said corrected data, and means for running a predetermined coherency protocol, under the control of said processor, to ensure coherency between said plurality of cache memories.

* * * * *